United States Patent
Van Nest et al.

(10) Patent No.: US 8,266,577 B2
(45) Date of Patent: Sep. 11, 2012

(54) RFID ENHANCED OPERATING SYSTEM (EOS) FRAMEWORK

(75) Inventors: Nancy Lee Van Nest, Delray Beach, FL (US); Keith Rider, Boynton Beach, FL (US); Mohamed Benyounes, Boca Raton, FL (US); Michael Polyakov, Boynton Beach, FL (US); William Jeffreys, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 1037 days.

(21) Appl. No.: 12/207,242

(22) Filed: Sep. 9, 2008

(65) Prior Publication Data

US 2010/0060422 A1 Mar. 11, 2010

(51) Int. Cl.
G06F 9/44 (2006.01)
G06F 9/00 (2006.01)

(52) U.S. Cl. ........................ 717/100; 717/120; 340/572.1

(58) Field of Classification Search ............... 340/571.1, 340/572.4, 10.1; 717/100, 120; 179/328; 719/328
See application file for complete search history.

(56) References Cited

U.S. PATENT DOCUMENTS

| | | | | |
|---|---|---|---|---|
| 8,082,256 B2 * | 12/2011 | Inoue et al. | ................... | 707/740 |
| 8,120,489 B2 * | 2/2012 | Hatanaka et al. | .......... | 340/572.4 |
| 2006/0267731 A1 * | 11/2006 | Chen | ............................ | 340/10.1 |
| 2007/0207792 A1 * | 9/2007 | Loving | .......................... | 455/418 |
| 2007/0250358 A1 * | 10/2007 | Le | ..................................... | 705/7 |
| 2009/0048936 A1 * | 2/2009 | Lerch et al. | ..................... | 705/17 |
| 2010/0060422 A1 * | 3/2010 | Van Nest et al. | ............. | 340/10.1 |

* cited by examiner

Primary Examiner — Christopher B Shin
(74) Attorney, Agent, or Firm — Alan M. Weisberg; Christopher & Weisberg, P.A.

(57) ABSTRACT

A radio frequency identification ("RFID") reader includes a hardware platform having a transceiver, an input/output interface, a controller, and a memory. The transceiver receives communication signals from at least one RFID tag. The controller is communicatively coupled to the transceiver and the input/output interface and controls the operation of the RFID reader. The memory is communicatively coupled to the controller and contains a software development framework for developing a software application. The framework includes a plurality of predefined encapsulated functional components that interact with at least one of the transceiver and the input/output interface, to allow the software application to operate in a manner that is independent of a specific embodiment of the RFID reader hardware platform.

16 Claims, 12 Drawing Sheets

| Channel Name | Source Names | Maximum Report Size | Reporting Interval | State Resync Cycle | Retry If Connect Fail Flag | Lease Max Duration | Output Buffer Max | Primary/ Secondary URIs |
|---|---|---|---|---|---|---|---|---|
| 104 | 106 | 108 | 110 | 112 | 114 | 116 | 118 | 120 |

Notification Channel Parameters Data Structure — 102

FIG. 8

| Event Type | Tag State | Tag Source Name | Tag ID | Air Protocol | Trigger | Tag Detection Time |
|---|---|---|---|---|---|---|
| 124 | 126 | 128 | 130 | 132 | 134 | 136 |

Tag Event Data Structure — 122

FIG. 9

Display Parameters Data Structure

Message Data Structure

RFID ENHANCED OPERATING SYSTEM (EOS) FRAMEWORK

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for developing software applications and, more specifically for a method and system for developing software applications executed on a radio-frequency identification ("RFID") reader.

BACKGROUND OF THE INVENTION

Radio-frequency identification ("RFID") systems provide a method for automatic identification that uses devices called RFID tags to remotely store and retrieve data. An RFID tag may be attached to or incorporated into a product and identifies the product through radio-frequency ("RF") waves. Most RFID tags contain an integrated circuit ("IC") and an antenna. The IC stores and processes information, and modulates and demodulates an RF signal. The antenna receives and transmits the RF signal. RFID readers communicate with the IC of the RFID tag to relay information between the tag and the reader concerning the product. Today, there is a widespread use of RFID systems in enterprise supply chain management for improving the efficiency of inventory tracking and management.

RFID readers generally report all tag data that is read. Duplicate tag reads and redundant data are reported without filtering. Third party "middleware" software receiving the tag data typically provides a layer of filtering so that the data set reported to the customer is a meaningful representation of the number of tagged cartons or individual tagged products that have passed through an antenna field.

A software solution that provides advanced capabilities for processing and reporting tag data based on customizable tag events and resides on the RFID reader is very desirable for customers. This allows a customer to have control over the type and amount of data received from the RFID reader and use the data in any number of custom applications. One prior solution provided an interface between the RFID reader and the user. However, in this product, all features were hard-coded into the application, rendering development of new applications slow and inflexible. Adding features required modifying and recompiling the existing application code. Third party users often needed to customize a comprehensive configuration file, typically very specific to their particular site, enabling and disabling features that were configurable.

The difficulty presented in creating a software solution for multiple RFID readers and reporting tag data to various middleware packages has highlighted the need for a faster development environment. Consideration of the need for customizable feature sets and ongoing enhancements to support additional readers and middleware packages has underlined the need for the creation of a predefined development framework to serve as a basis from which applications may be rapidly developed.

Therefore, what is needed is a system and method for rapidly developing software applications that reside on an RFID reader using a predefined development framework.

SUMMARY OF THE INVENTION

The present invention advantageously provides a method, system and radio frequency identification ("RFID") reader for rapidly developing software applications that reside on an RFID reader using a predefined development framework. The development framework allows the software application to operate in a manner that is independent of a specific embodiment of the RFID reader hardware platform.

In accordance with one aspect of the present invention, an RFID reader includes a hardware platform including a transceiver, an input/output interface, a controller, and a memory. The transceiver is arranged to receive communication signals from at least one RFID tag. The controller is communicatively coupled to the transceiver, the input/output interface, and the memory. The controller controls the operation of the RFID reader. The memory contains a software development framework for developing a software application that is executable on the hardware platform. The framework includes a plurality of predefined encapsulated functional components that interact with at least one of the transceiver and the input/output interface to allow the software application to operate in a manner that is independent of a specific embodiment of the RFID reader hardware platform.

In accordance with another aspect of the present invention, a method is provided for developing software applications residing on an RFID reader. The RFID reader includes a memory. A software development framework is stored in the memory of the RFID reader. The software development framework includes a plurality of predefined functional components that interact with the RFID reader in a manner that is independent of RFID reader hardware.

In accordance with yet another aspect of the present invention, a system for developing RFID reader-resident applications includes an RFID reader and a host computer. The RFID reader has a hardware platform which includes a memory for storing at least one software application. The host computer is communicatively coupled to the RFID reader. The host computer includes a software development framework for developing the at least one software application. The framework includes predefined encapsulated functional components that interact with the RFID reader hardware platform to allow the at least one software application to operate in a manner that is independent of a specific embodiment of the RFID reader hardware platform.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 8 is a diagram of an exemplary notification channel parameters data structure constructed in accordance with the principles of the present invention;

FIG. 9 is a diagram of an exemplary tag event data structure constructed in accordance with the principles of the present invention;

DETAILED DESCRIPTION OF THE INVENTION

Figure 1:
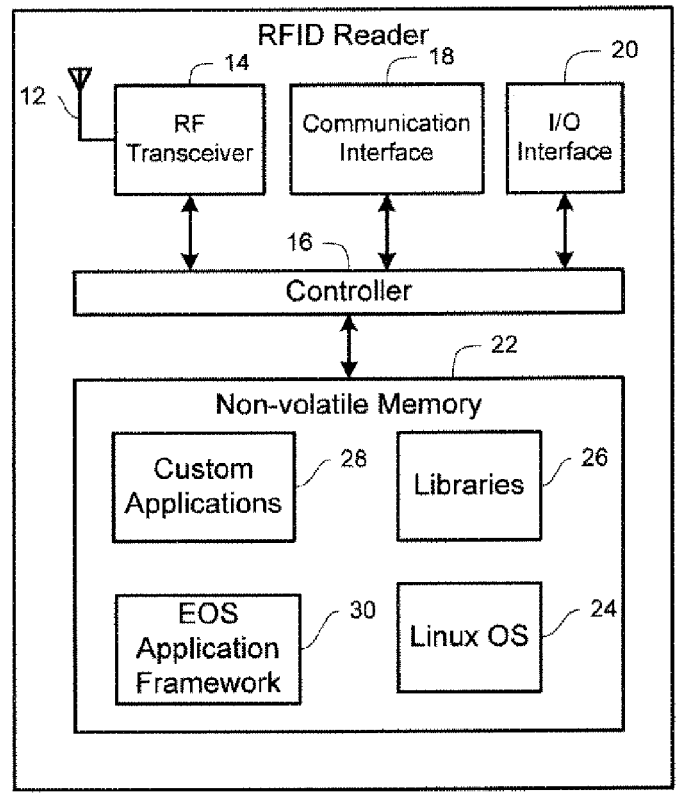
FIG. 1 is a block diagram of an exemplary radio frequency identification ("RFID") reader constructed in accordance with the principles of the present invention.

Before describing in detail exemplary embodiments that are in accordance with the present invention, it should be observed that the embodiments reside primarily in combinations of apparatus components and processing steps related to implementing a system and method for developing radio frequency identification ("RFID") reader resident applications which process, filter and report tag data based on customizable tag events. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and framework for developing resident RFID reader applications using a set of predefined building blocks called Enhanced Operating System ("EOS") functional components. The EOS application framework provides users with the ability to develop RFID reader resident applications in a fast and efficient manner. The framework allows application developers to focus on the application itself and not the details of I/O interfaces and third party application programming interface ("API") calls. The framework enables application programmers to create customized systems that provide minimal to fully featured EOS functionality.

Referring now to the drawing figures in which like reference designators refer to like elements, there is shown in FIG. 1, an exemplary RFID reader constructed in accordance with the principles of the present invention, and designated generally as "10." RFID reader 10 includes an antenna 12 coupled to an RF transceiver 14 which transmits RF signals to and receives RF signals from an RFID tag (not shown) in a well-known manner. The RF transceiver 14 is coupled to a controller 16 which generally controls the operation of RFID reader 10.

The controller 16 is also coupled to a communication interface 18 and an input/output ("I/O") interface 20. The I/O interface 20 interacts with any of a number of peripheral input/output devices to present information to and collect information from a user, including, but not limited to, a display screen, a keyboard, a keypad, a mouse, etc. The I/O interface 20 may include any number of I/O ports, including but not limited to, serial, parallel, Universal Serial Bus ("USB"), Firewire, VGA, HDMI, and other audio/video ports.

The communication interface 18 enables communication between the RFID reader 10 and a communication network, including but not limited to a local area network ("LAN"), a wide area network ("WAN") such as the Internet, or other intranet, a personal area network ("PAN"), a campus area network ("CAN"), a metropolitan area network ("MAN"), etc. The communication interface 18 may be wired or wireless and may communicate using a variety of communication protocols, including, but not limited to, high level wireless communication protocols as defined by the Institute of Electrical and Electronics Engineers ("IEEE") standard 802.15.4 ("Zigbee"), the communications standard defined by IEEE 802.11, ("Wi-Fi"), the communication protocols defined under IEEE 802.16, ("Wi-MAX"), the industrial specification for wireless personal area network ("PAN") communication developed by the Bluetooth Special Interest Group ("Bluetooth"), the communication protocols standardized under IEEE 802.3 ("Ethernet"), etc.

The controller 16 is also coupled to a non-volatile memory 22 which contains instruction modules for controlling the operation of the RFID reader 10. Instruction modules include an operating system 24, such as the Linux operating system, and libraries 26 associated with writing, compiling and running software applications 28 using the Linux operating system 24. The non-volatile memory 22 also includes an Enhanced Operating System ("EOS") application framework 30 which provides predefined building blocks for creating applications 28 resident to the RFID reader 10. The EOS Framework 30 is discussed in more detail below. It should be noted that although the exemplary EOS Framework 30 and RFID reader 10 are shown to operate using the Linux OS 24, the concepts and principles of the present invention may be equally applied to other equivalent operating systems such as the Microsoft Windows OS family, Macintosh OS family, Solaris and Unix.

Figure 2:
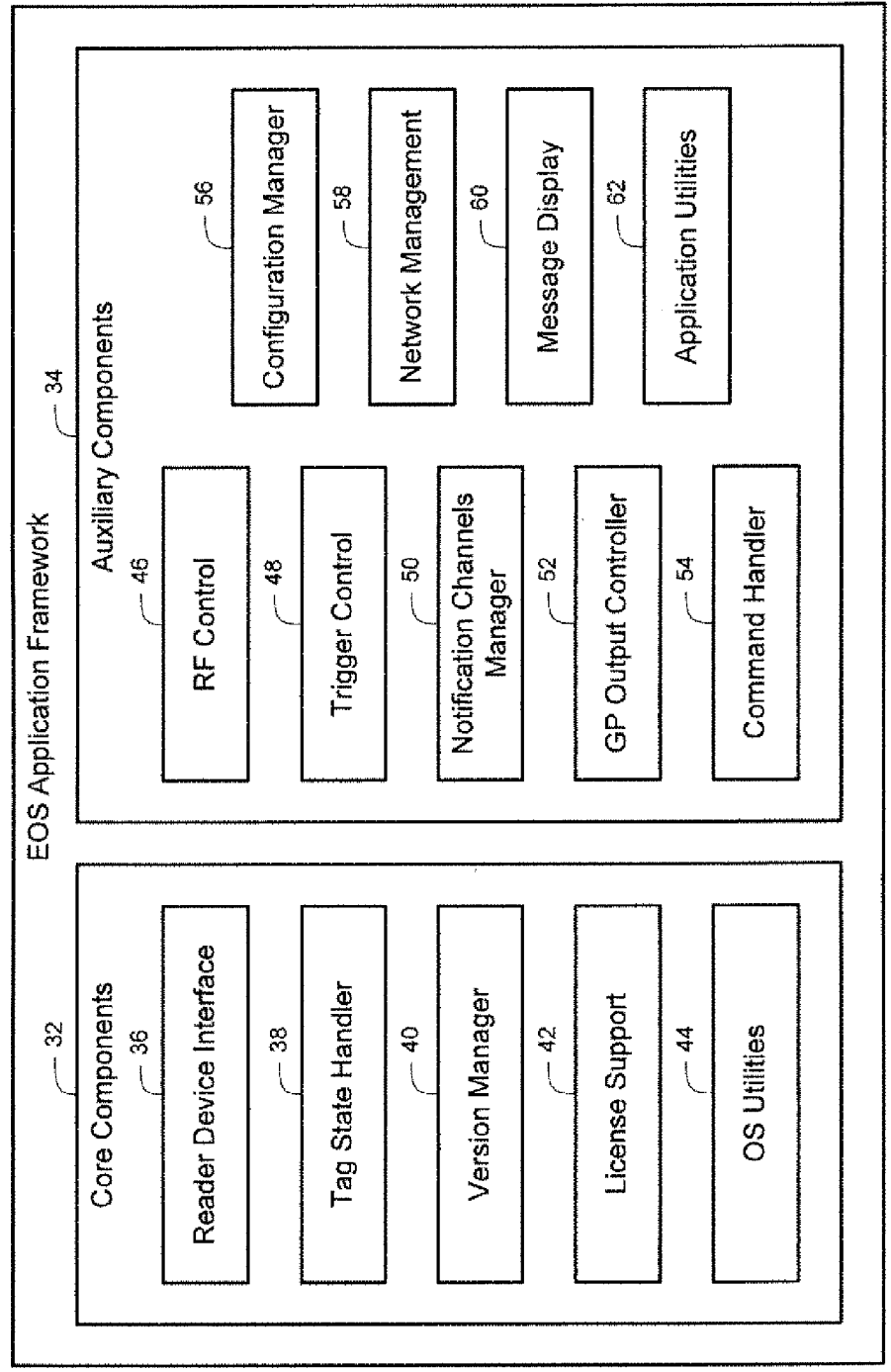
FIG. 2 is a block diagram of an exemplary Enhanced Operating System ("EOS") application framework constructed in accordance with the principles of the present invention.

Referring now to FIG. 2, an EOS application framework 30, according to one embodiment of the present invention, provides a portable platform for RFID reader application development. An application 28 that is developed using the EOS Framework 30 does not need to depend upon the actual reader hardware platform, or any vendor API. Reader platform dependency is abstracted from the application 28 by the EOS Framework 30.

The EOS application framework 30 is an object-oriented framework that maintains the object oriented concept of encapsulation and has a well defined public interface. The framework 30 provides an API for developers, which allows customization of configuration by publishing interface methods to programmatically modify values independent of a configuration flat file.

The EOS application framework 30 is an architecture in which basic building blocks, called EOS functional components, are composed in order to develop RFID reader resident applications 28. Each component provides an interface that allows access to its functionality. The framework 30 consists of core components 32 and auxiliary components 34. The core components 32 represent basic EOS functional components and the relationships between them. Core components 32 should be included in every application 24 and provide a minimal EOS functionality. Core components 32 may include a reader interface 36, a tag state handler 38, a version manager 40, a license support manager 42, and Operating System utilities 44. The core components 32 define a semi-complete core EOS application 24.

The reader interface 36 provides an object-oriented interface to the reader vendor API, as well as interfaces required to completely operate and manage the reader 10. The tag state handler 38 filters out RFID tag responses according to their current state; thus, reducing the number of tag reads queued for transmission to the host. The version manager 40 maintains and reports reader software version information. The license support component 42 is responsible for licensing the reader and monitoring the EOS Framework license. The OS utilities 44 are a set of wrappers for OS facilities that simplify the usage of the OS system 24 functions. The OS utilities 44 implement a consistent usage policy for these functions, as well as allow for easy migration from one operating system to another, as only these wrappers need to be modified in order to use the EOS Framework 30 with a new OS. Each core component 32 is discussed in more detail below.

Auxiliary components 34 include those areas where a developer uses the framework 30 to add custom software to increase functionality of the EOS Framework 30 to address individual project needs. An application developer may extend the core functionality by incorporating auxiliary framework components 34. In other words, when the application developer composes an application 24 with the framework 30, he/she may ignore the inner workings of the framework 30, and add only those auxiliary components 32 necessary to address the particular application requirements without having to modify existing application code. Auxiliary components 34 customize the framework 30 by being combined with the core components 32 during the instantiation process. Auxiliary components 34 include an RF control component 46, a trigger control component 48, a notification channels manager 50, a general purpose ("GP") output controller 52, a command handler 54, a configuration manager 56, a network management component 58, a message display component 60, and application utilities 62.

The RF control component 46 processes RF Schedule and RF Search Actions and schedules tag searches. The trigger control component 48 processes triggers, which include an input trigger and a set of actions to perform. The notification channels manager 50 creates and deletes notification channels used to deliver tag events data to host computers. The GP output controller 52 controls the states of General Purpose outputs. The command handler 54 processes incoming commands from the managing host computer. The configuration manager 56 extracts component configuration parameters from EOS Configuration files. The network management component 58 has two separate subcomponents, an outage report and a SNMP network management, each of which are discussed in more detail below. The message display component 60 displays application text messages on an LED/LCD display connected to the reader I/O interface 20. Application utilities 62 are used by the framework components as well as framework applications to facilitate faster feature and application development. Each auxiliary component 34 is discussed in greater detail below.

Core Components

Core components 32 represent a basic set of instructions that allow a user to create a working application. In one embodiment of the present invention, the following core components 32 are usable for each application.

Reader Interface

Figure 3:
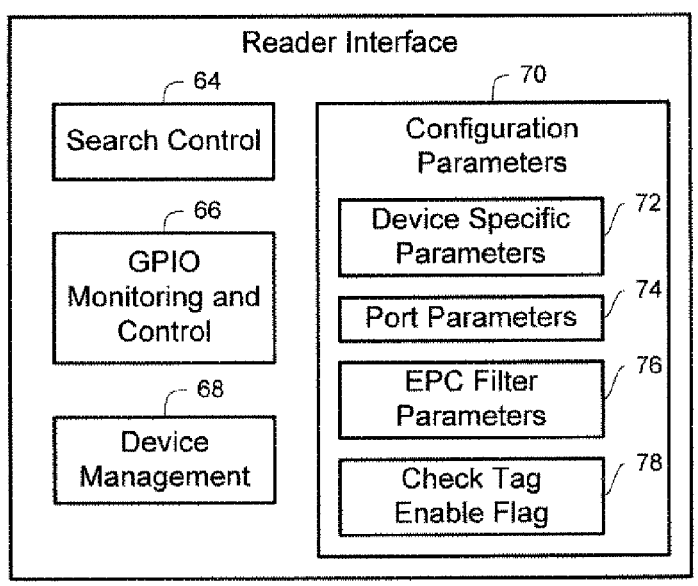
FIG. 3 is a block diagram of a reader interface component, which controls the reader hardware, constructed in accordance with the principles of the present invention.

FIG. 3 shows an exemplary block diagram of a reader interface component 36. Functions of the reader interface 36 may be performed by three interface blocks: search control 64, General Purpose I/O ("GPIO") monitoring and control 66, and device management 68. Search control 64 provides the user with the ability to start tag searches and perform tag write, lock and kill functions. Search control 64 also provides notifications when a tag search operation finds tags in the field or times out (no tags found in the field). The GPIO monitoring and control 66 provides a user with the ability to register for notifications of input state changes and to set outputs to a desired state. Furthermore, if a serial device, such as a display device is connected to the reader's I/O interface 20, the GPIO monitoring and control interface 66 allows the user to send data to the device. The device management 68 section provides an interface to reader Linux shell commands and management API. The device management 68 section allows the user to set and get reader network parameters, to perform reader reset and restart, as well as update reader firmware. Additionally, the device management 68 section contains interfaces to register for reader failure notifications, such as restart, reset, antenna failure, etc. The reader interface 36 is an active component that uses configuration parameters 70 for initialization. Exemplary configuration parameters 70 include device specific parameters 72, port parameters 74, electronic product code ("EPC") filter parameters 76, and a check tag enable flag 78. Device specific parameters 72 include parameters specific to each reader type. Port parameters 74 include parameters required to initialize an I/O port. Port parameters 74 may include such items as baud rate, parity, number of bits and flow control. EPC filter parameters 76 may include a mask and value for the EPC tag filters to use to filter out non desired tags. The check tag enable flag 78 is used to enable antenna failure detection.

EOS Framework components needing access to reader resources use the reader interface 36 to perform their tasks. Once the reader interface component 36 is initialized, it attempts to connect to reader 10 firmware using the reader native API, i.e., vendor API. If the connection is successful, other components and the application may instantiate and initialize. Otherwise, the EOS process exits.

In order to receive tag data collected by the reader, the user, via an application, registers with the reader interface 36 using a pointer. The reader interface 36 sends at least one tag message to the user via the application's process method. Each tag message may contain information such as the antenna on which the tag is read, the air protocol used to read the tag, e.g., GEN2, the number of bits in a tag ID, the tag ID, the tag ID CRC, the number of times a tag is read, the tag detection time stamp, the port to which the antenna is attached, etc.

The application process method can be designed to be very efficient, as the application process method executes in the context of the reader interface 36 thread. Inefficient implementation of this method may have negative effects on the performance of the reader 10. Generally, the application process should only deposit the tag message in some application queue and return. The user application 28 may then remove the tag message from the queue and take time processing the message.

Tag State Handler

Figure 4:
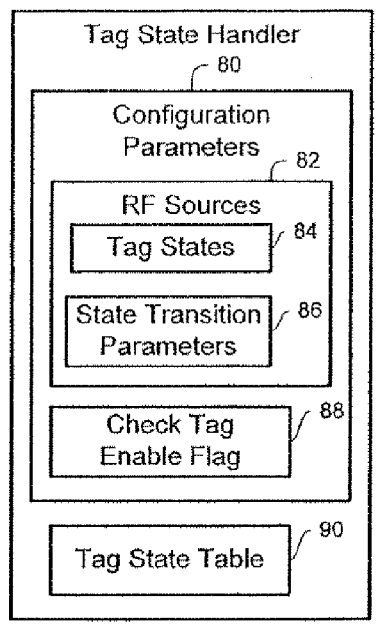
FIG. 4 is a block diagram of an exemplary tag state handler component constructed in accordance with the principles of the present invention.

A block diagram of the tag state handler 38 is shown in FIG. 4. The tag state handler component 38 is used to filter out tags according to their current state, thereby, reducing the number of tag reads queued for transmission to the host. When the reader 10 is searching for tags, it may encounter the same tag multiple times during the same search cycle. To prevent reporting the same tag multiple times, a Finite State Machine for a tag ("Tag FSM") can be defined. The tag state handler 38 implements this Tag FSM.

The configuration parameters 80 for the tag state handler 38 include a container of RF sources 82. RF sources 82 is a named grouping of antennas located in a specific area. The RF sources 82 are discussed in greater detail below in relation to auxiliary component RF control 46. Each RF source 82 contains information about which tag states 84 the user is interested in and what the state transition parameters 86 are. Possible tag states 84 that the tag state handler 38 may generate include: new, glimpsed, observed, lost, purged, and unknown. State transition parameters 86 may include an observed threshold, an observed timeout, a glimpsed timeout, and a lost timeout.

Another configuration parameter 82 used by the tag state handler 38 is the state eval cycle time parameter 88 (in milliseconds). Every single tag read is queued into a tag state table 90 (represents the state of tags currently in the field) for state transition evaluation purposes. The evaluation cycle is the cycle at which tags in the tag state table are evaluated for state transitions. When a tag reaches the "Unknown" state, it is discarded from the state table 90.

The tag state handler interface 38 allows user to query configuration parameters, register and/or deregister for notification of tag state transitions, i.e., tag events, and request a tag state table resynchronization. To promote loose coupling between components, in one embodiment, the tag state handler 38 does not deliver tag events directly to a notification channel queue. Instead, the notification channels manager 50 registers for notifications of tag events from specific sources. The tag state table resynchronization request causes the tag state handler 38 to generate tag events based on the current states of all tags in its tag state table 90. This method is generally used to determine the state of the tags that are in an RF field accessible to the RFID reader 10.

Version Manager

The version manager component 40 is used for maintaining and reporting reader software version information. The version manager interface 40 provides the user with ability to set application version attributes as well as query the version of any one of the following exemplary software components: EOS Framework version, reader vendor, reader type, reader firmware version, application name, application company name, application version, and application Globally Unique Identifier ("GUID"). In one embodiment, the version manager 40 may not require any configuration parameters to start executing. During its initialization, the version manager 40 may query an application for its application version attributes. If the application fails to provide these attributes, the version manager 40 will cause the EOS process to exit.

License Support

The license support manager 42 is responsible for licensing the reader 10 and monitoring the EOS Framework license. In one embodiment, the EOS Framework 30 is arranged such that it must be licensed in order to operate. The license manager interface 42 provides the following methods:

Get License Key Seed—returns the reader's MAC address as the license key seed.

Set License Key—created a valid license file on the reader.

Get License Status—returns information about the state of the license on the reader. This information may include whether the license file is present, whether the license is valid, whether the license is under evaluation mode, and the length of time remaining in evaluation mode.

The license manager 42 may support monitoring of the EOS Framework license only, or monitoring of the actual application license.

Operating System Utilities

In order to make EOS Framework 30 portable, one embodiment of the EOS Framework 30 does not use Linux operating system threads library directly. Instead, the EOS Framework 30 may include Operating System utilities 44 consisting of a set of wrappers for OS facilities, such as threads, semaphores, mutexes, reader-writer locks and conditional variables. These wrappers simplify the usage of the OS system functions and implement a consistent usage policy for these functions. The OS utilities 44 allow for easy migration from one operating system to another, as only these wrappers need to be modified to implement a new OS.

Auxiliary Components

RF Control

Figure 5:
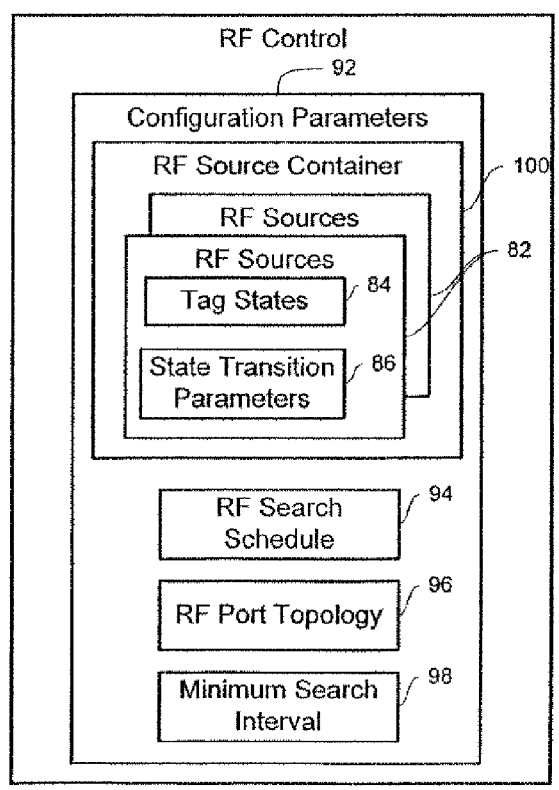
FIG. 5 is a block diagram of an RF control component constructed in accordance with the principles of the present invention.

Referring now to FIG. 5, a block diagram of an RF control component 46, constructed in accordance with the principles of the present invention is shown. In one embodiment, the RF control component 46 is responsible for processing RF schedule and RF search actions and scheduling tag searches. Additionally, RF control 46 provides interfaces to initialize RF control 46 and start its execution, start searching on a set of RF sources 82 for a specific duration, stop searching on a set of RF sources 82, suspend and resume RF control 46 execution, report whether RF control 46 is active or suspended, i.e., idle, and register/deregister from receiving search started and search completed messages.

Configuration parameters 92 for RF control 46 include RF search schedule 94, RF sources 82, RF port topology 96, and minimum search interval 98. RF search schedule 94 is a schedule for searching on specified sources. The RF sources parameter 82 includes a named grouping of antennas located in a specific area. RF port topology 96 specifies reader ports that are connected to antennas. Minimum Search Interval 98 sets the minimum number of milliseconds that a reader 10 is allowed to continue with a tag search prior to being stopped in order to resume with the next search. Each of these configuration parameters is described in more detail below.

In one embodiment, the initialization of RF control 46 is tightly coupled with the initialization of trigger control 48. Both the RF control 46 and the trigger control 48 components should be instantiated prior to initializing either one. Instantiate involves creating an object and all of its elements in computer memory so the object is accessible by other program elements. In other words, once both are instantiated, they can both be initialized. In one embodiment of the EOS Framework 30, RF control 46 initialization depends upon trigger control 48 having been instantiated in order to register for the processing of search and stop search actions. On the other hand, trigger control 48 initialization depends upon RF control 46 having been instantiated in order to register for the processing of search started and search completed messages.

RF control 46 may run immediately upon initialization as long as a search schedule 94 is available. RF control 46 processes the first scheduled search entry by issuing an appropriate search request, then processes the next scheduled search entry and continues in a round robin fashion until stopped. The search duration for each entry is the minimum amount of time that the reader will search on the entry's sources.

If the RF search schedule 94 is not present, RF control 46 waits for a search action emanating from a trigger firing or an application request to perform the next tag search. A "search action" is described in more detail below in reference to the trigger control 48. Upon receiving a search action, RF control 46 issues a search request to the reader device interface 36. If multiple search actions are received, RF control 46 combines sources from active search actions and re-issues a search request for new set of active sources. RF control 46 monitors durations to determine when a search action has completed.

Figure 6:
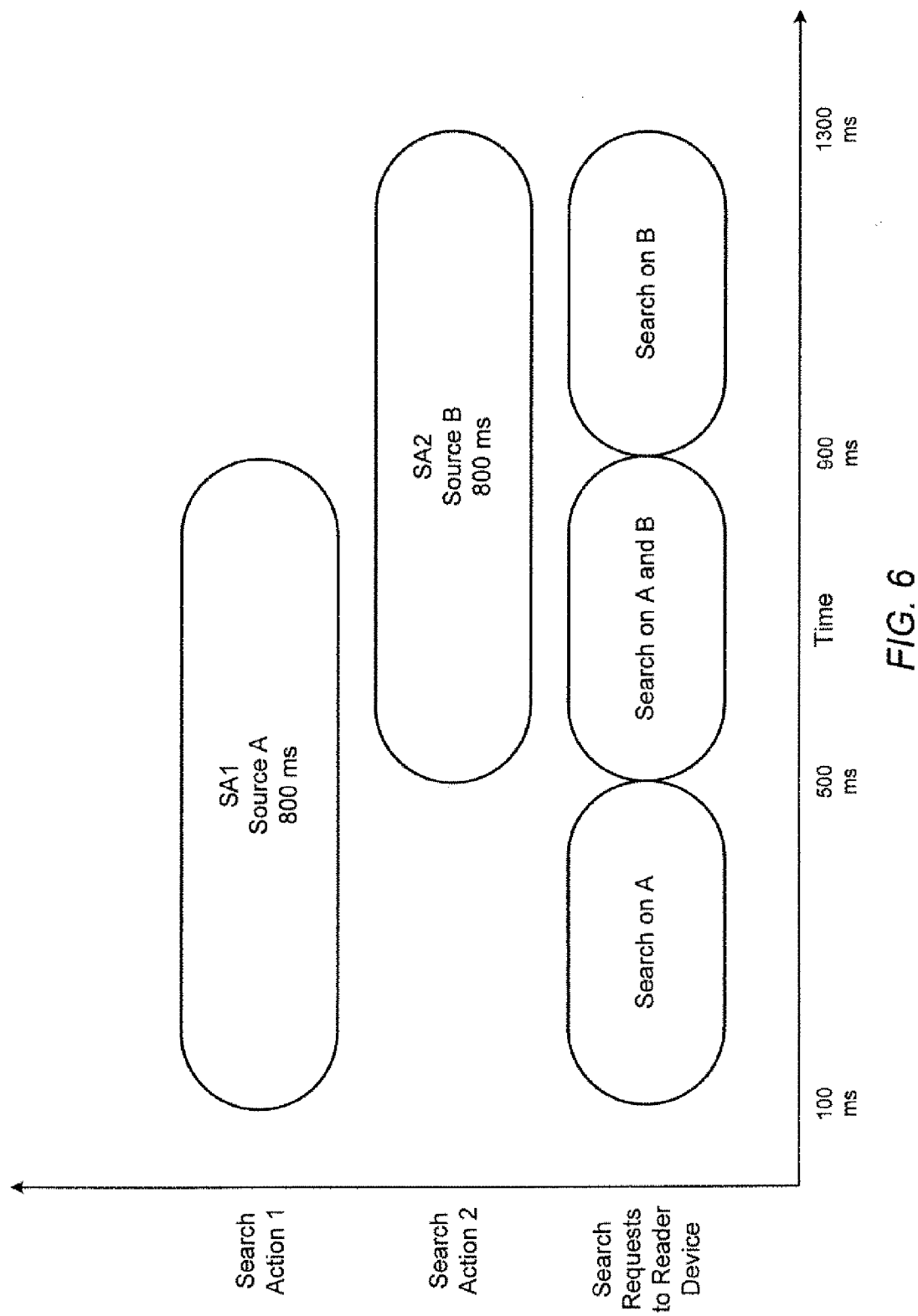
FIG. 6 is a graph depicting exemplary timing operations of an RF control component processing multiple search actions in accordance with the principles of the present invention.

FIG. 6 illustrates the RF control 46 processing multiple search actions. If both RF schedule and a tag search action are present, RF control 46 combines the RF sources and search durations of both in performing a tag search.

Figure 7:
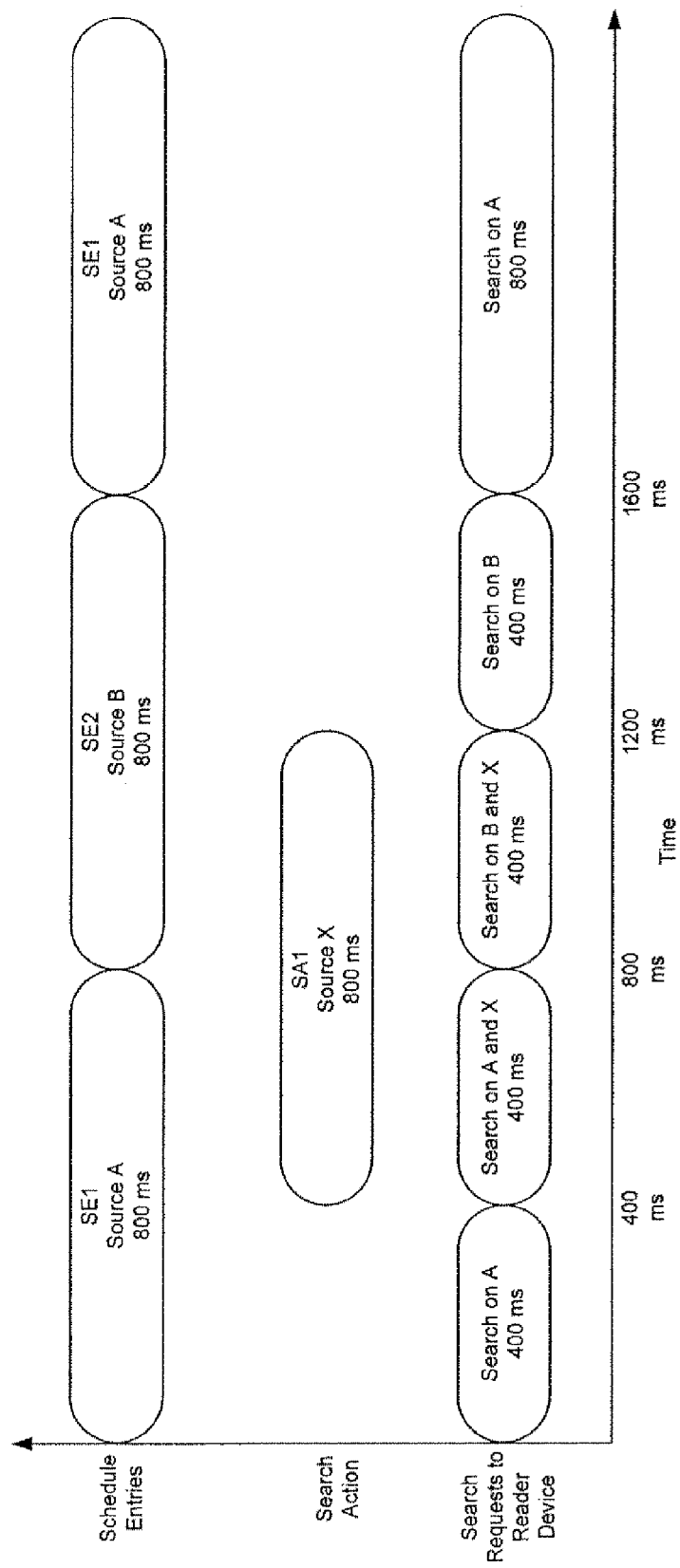
FIG. 7 is a graph depicting exemplary timing operations for combining an RF schedule and a tag search action in accordance with the principles of the present invention.

FIG. 7 illustrates the combining of an RF schedule and a tag search action. When a request to stop RF control 46 is activated via RF control stop method, RF control 46 is blocked from execution until a resume method is invoked. During this time, RF schedule entries and search actions are ignored. The execution resumes at an entry where the RF control 46 initially stopped.

The RF search schedule 94 is used to search based on a time schedule. The schedule 94 consists of a number of schedule entries, which may be either a search entry or a delay entry. The search entry consists of a duration, e.g., in milliseconds, and a set of sources to search on. When RF control 46 encounters the search entry, it issues a search request to the reader device interface 36. Once the search duration expires, RF control 46 issues a stop search to the reader device interface 36. The delay entry consists of a delay duration element, e.g., in milliseconds. During the delay period, RF control 46 does not issue any scheduled search requests. However, if a search action becomes active during a delay period, a corresponding search request may be issued.

RF sources 82 may be used for several purposes. For example, RF sources 82 allow an application developer to group antennas based on location, such as "shelf" or "dock door", etc. RF sources 82 also provide configuration data for the tag state handler 38. Each RF source 82 entry may contain the name of the location, port IDs of antennas belonging to this source, a list of tag states 84 to report, and state transition parameters 86. RF source 82 entries are combined into a container, namely RF source container 100. The RF source container 100 allows the user to search for a source based on a source name or port that the source contains.

The RF port topology 96 contains a list of all the RF ports that are defined in the system. RF port topology 96 allows the user to convert an antenna number to an RF port data structure which is used by the reader device interface 36. The RF port topology 96 provides the following functions: add/remove RF port, get/set port address, and get/set power level. Each port contains a port address, e.g., reader port number, and a port power level.

Trigger Control

The trigger control component 48 processes trigger actions, i.e., performs a set of actions based on a trigger event. The trigger control interface 48 allows the user to add triggers, remove triggers, clear all triggers, register/deregister for processing actions, and process application event messages. The trigger control 48 does not require parameters in order to be initialized. Trigger control 48 is thread-safe; therefore, triggers can be added and removed at any point during runtime. Note that the trigger control component 48 is coupled with RF control 46 and its instantiation and initialization should follow the rules specified above for the RF control 46.

Trigger control 48 processes triggers. Triggers include an input trigger and a corresponding set of actions to perform. An input trigger specifies triggering events which cause activation of the trigger. Specific triggers may include, for example, a GP input trigger, a sequenced GP input trigger, a tag search successful input trigger, a tag search timeout input trigger, and an application input trigger. A GP input trigger is activated when a specified GP input transitions to a specified state. For example, if input "A" transitions to high, then activate this trigger. A sequenced GP input trigger may be activated when a specified GP input transitions to a specified state and then another GP input transitions to a specified state within a specified time duration. For example, if input "A" transitions to high and then input "B" transitions to high within 300 ms of input "A", then activate an action. A tag search successful input trigger may be activated when RF control 46 completes a search request and one or more tags were detected during that search request on specific sources. Trigger control 48 automatically registers with RF control 46 to receive a search completed message, i.e., search completed means at least one tag is read during the search. A tag search timeout input trigger may be activated when RF control 46 completes a search on specified sources and no tags are detected during that search. Trigger control 48 automatically registers with RF control 46 to receive search timeout messages.

An application input trigger is a trigger that is named and called by an application 28. When the application specified condition occurs, the application 28 can execute a process application event message method. The application event message contains a string with the event name. When the application 28 invokes trigger control's 48 process method passing in the event message, trigger control 48 executes the trigger action associated with that trigger. Trigger actions such as search action, stop search action, set GP output action, display message action, and notify application event action are contemplated. Search action is used by RF control 46 to start a search request. Search action includes a list of source names to search for as well as a search duration. Stop search action is used by the RF control 46 to terminate a search on a set of sources. Stop search action includes a list of source names that require search termination. Set GP output action is used by the GP output controller 52 to set a specific output to a specific state for a specific duration. Set GP output action includes an output number, a desired state and a specific duration. Display message action is used by the message display 60 to display a named message on an optional LCD display attached to the reader's I/O port. Display message action contains the name of the message to display. Notify application event action is used to notify an application 28 to execute a named action and contains the name of the action to be executed.

To promote loose coupling between different components in the framework 30, trigger control 48 does not call action processing methods of other components directly. Other components, as well as applications 28, register with the trigger control 48 for processing the above actions. Trigger control 48 uses the notification mechanism to inform other components to execute the action. For example, RF control component 46 registers for search action and stop search action, output controller component 52 registers for set GP output action, message display component 60 registers for processing display message action, and the user application 28 registers for application event action.

Notification Channels Manager

The notification channels manager component 50 is used to create and delete notification channels used to deliver tag events data to host computers. Notification channels manager 50 may be initialized from configuration using a notification channel parameters data structure 102, shown in FIG. 8. The exemplary notification channel parameters data structure 102 contains the following fields: channel name 104, source names 106, maximum report size 108 (in bytes), reporting interval 110, state resync cycle 112, retry if connect fail flag 114, lease max duration 116, output buffer max 118, and primary/secondary URIs 120.

Channel name 104 includes a name used to identify the notification channel. Source names 106 contain a list of source names that this channel registers with to receive tag events. Maximum report size 108 contains the maximum length of reports from this channel in bytes. Reporting interval 110 establishes how often to send reports. State resync cycle 112 determines how often to send a request to the tag state handler 38 to resynchronize with the tag state table 90. The retry if connect fail flag 114 determines whether the channel should continuously retry to send data if the TCP/IP connection fails. Lease max duration 116 specifies the amount of time a channel is to remain active prior to its automatic deletion. Lease max duration 116 may be used as a service channel to diagnose tag reads in case of antenna or reader malfunction. The channel is automatically deleted once the lease duration expires. Output buffer max 118 specifies the size of the channel tag events output buffer in bytes. Primary/Secondary Uniform Resource Identifiers ("URIs") 120 include TCP/IP addresses and ports of data target host computers. The channel will attempt to connect to the primary URI first, and if the connection attempt fails, automatically switches to the secondary URI.

The notification channels manager 50 reports tag event data in the form of Event Reports. In addition to tag events, other significant events are reported, including but not limited to, reader reset event, buffer full event, buffer reset event, resynch start event, resynch complete event, input trigger event, and a good-bye or channel termination event.

Figure 10:
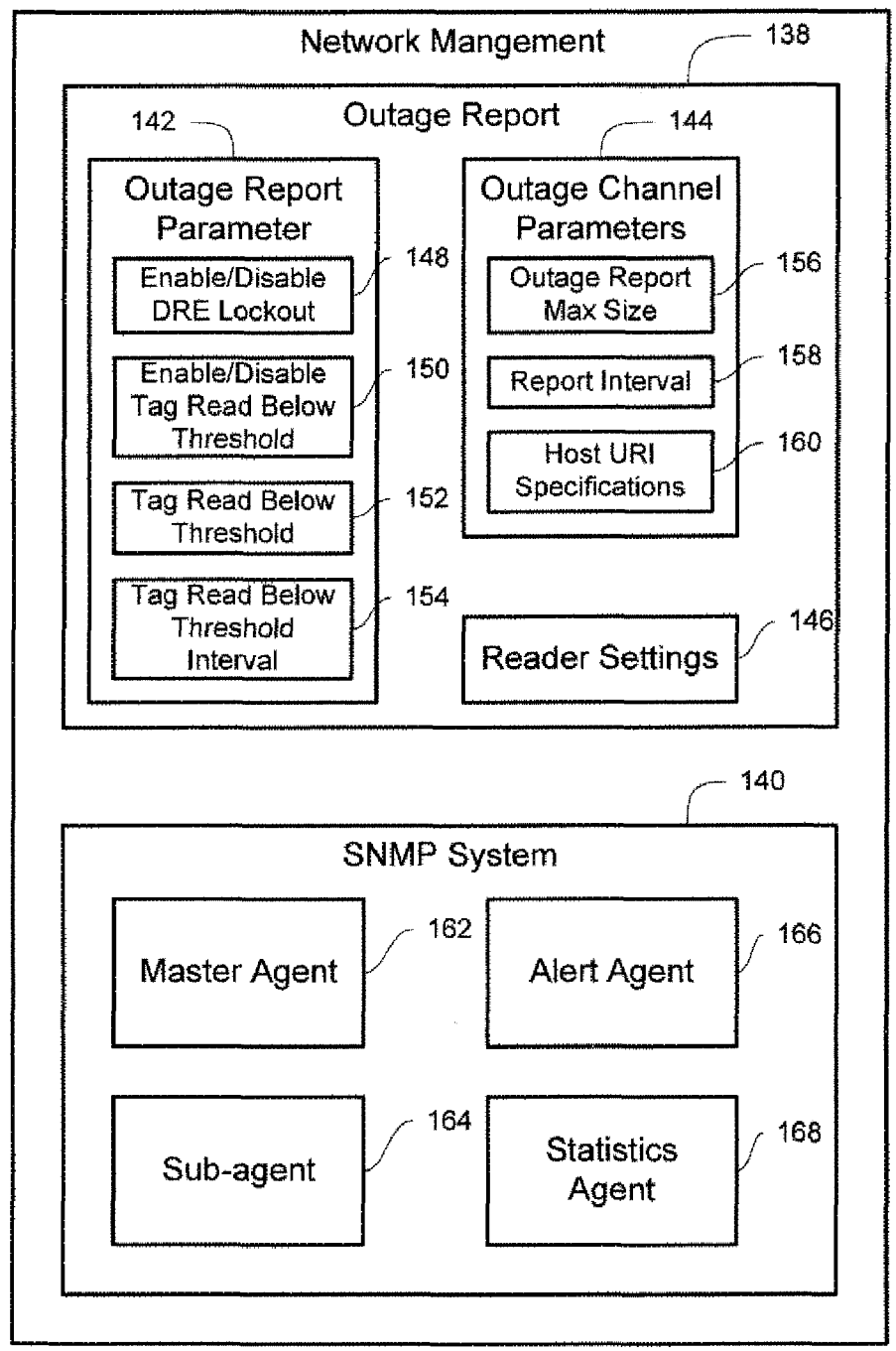
FIG. 10 is a block diagram of a network management component constructed in accordance with the principles of the present invention.

An exemplary tag event data structure 122 is shown in FIG. 9. The tag event data structure 122 contains the following fields: event type 124, tag state 126, tag source name 128, tag id 130, air protocol 132, trigger 134 and tag detection time 136. The event type field 124 describes the type of notification message; for example, tag event or reader reset event. The tag state filed 126 indicates whether or not the tag was seen in the previous read cycle. The tag source name field 128 identifies the antenna or grouping of antennas that detected the tag. The tag id field 130 is the EPC global tag identifier. The air protocol field 132 refers to the type of protocol used to communicate with the tag. The trigger field 134 applies to an input trigger event that is reported if an input port signal transitions from Low to High, or vice versa. Tag detection time 136 is the time stamp at which the tag was read. An exemplary input trigger event data structure 138 is shown in FIG. 10. The input tag event data structure is similar to the tag event data structure 122 but typically only contains fields for the event type 124, an input number, input state and an event occurrence time. The input number is the number of the physical input port. The input state is Low or High, reflecting the type of transition. Event occurrence time is the time the transition is detected at the input port. Other events may contain event type and occurrence time.

All channels may monitor their own state and data buffers. The user can set up a percentage full threshold and be notified when the buffer reaches that threshold. To do so, the user sets the threshold and registers for notification of the tag event buffer threshold message. The notification channels manager interface 50 may perform several functions. For example, using the notification channels manager 50, a user may create a new channel with new input parameters, remove an existing channel along with its output buffer, alter the parameters of a channel, set up buffer bull thresholds for all channels, request tag state resynchronization be performed, and register and/or deregister for notifications of messages such as failed to connect to target message, buffer threshold reached message, and buffer full message.

Output Control

The GP output control component 52 is responsible for controlling states of any general purpose output of the RFID reader 10. Output states are typically high and low. The output control component 52 does not require any configuration parameters. During initialization this component registers with the trigger control 48 for processing set GP output actions. As a result, output control 52 is instantiated after instantiating trigger control 48. Currently, this instantiation is controlled at the framework initialization.

As described above in relation to the Trigger Control section, the set GP output action contains three parameters: output number, output state, and duration. Trigger control 48 searches through all configured triggers to find their respective set GP output actions. Trigger control 48 then initializes all output states, using the reader device interface 36, to states opposite the action states. For example, if there is an action to set output 3 to closed state, trigger control 48 initializes the output to open state.

When output control 52 receives a set GP output action, it uses the reader device interface 36 to set the requested output to the requested state. Output control 52 then starts a timer for the length of the duration specified. When the timer expires, the state of the output is reset to its previous state.

Command Handler

The command handler component 54 processes incoming commands from the managing host computer. Command handler 54 creates two command channels, namely a secured and an unsecured channel. The secured channel accepts encrypted commands, such as Secure Socket Layer ("SSL") encrypted commands, over TCP/IP sockets. The unsecured channel accepts unencrypted commands over TCP/IP sockets. All the supported commands may be sent over the secured channel. To disallow certain commands on the unsecured channel, the user specifies in a configuration file the names of the commands which are allowed on the unsecured channel. This list can also be passed as a parameter to the configuration manager 56 when it is instantiated. Note that by default, if no commands are specified as unsecured accessible in the configuration file, the command handler 54 will allow any supported command to be processed as unsecured accessible.

Supported commands may include, but are not limited to: get firmware version, reboot, get configuration time stamp, update firmware, stop RF, resume RF, request state resynch, set IP address, get reader state, set output, get license key seed, set license key, get firmware update status, enable DHCP, set hostname, get hostname, set DNS servers, request file transfer, add notification channel, remove notification channel, get configuration file information, get license state, get software info, restart EOS, set configuration, set reader name, get reader name, set NTP server, get NTP server, set EPC filter list, and remove EPC filter list.

Configuration Manager

The configuration manager component 56 is responsible for extracting component configuration parameters from configuration files. An application may use the configuration manager 56 to retrieve its own configuration parameters from the application portion of a configuration file.

Network Management

Referring now to FIG. 10, the network management component 58, in one embodiment, consists of two separate sub-components, an outage report 138 and a Simple Network Management Protocol ("SNMP") system component 140.

The outage report 138 reports reader outage events to the host computer. Supported outage events may include reader reset, tag read below threshold, and dense reader environment ("DRE") lockout. DRE lockout is the disabling of a reader's RF operations if it is determined that the reader's RF operations is interfering with the RF operations of another reader. Outage reports 138 are formatted similarly to tag event reports, but they are sent out via a separate channel. The outage report interface 138 is initialized using outage report parameters 142, outage channel parameters 144 and reader settings 146. Outage report parameters 142 may include an enable/disable DRE lockout outage 148, an enable/disable tag read below threshold outage 150, a tag read below threshold outage count 152, and a tag read below threshold outage interval 154.

Outage reports 138 are messages from the reader 10 that indicate outages have occurred. For any of the outage report parameters 142 set to enabled, if that condition occurs, a report of that occurrence will be issued. For example, in the case of a DRE lockout outage, if the reader 10 goes into lockout state because conditions indicate dense reader environment, and the outage report parameter for DRE lockout 148 is enabled, an outage report will be issued. For the tag read below threshold outage, if the number of tags read in a read cycle is less than the threshold count, and the below threshold outage parameter is enabled, a below threshold outage report will be issued. For outage count, the number of tags read is compared to the value set in outage count to determine whether the count has been reached or is below threshold. For outage interval, the interval value tells at what time interval the tags are counted. If the number of tags counted is below the threshold, a notification is issued.

Outage channel parameters 144 may include an outage report maximum size 156, e.g., in number of events, a report interval 158, and primary and secondary host URI specifications 160. The reader settings 156 contain the reader name, which is included in the outage report 138.

Figure 11:
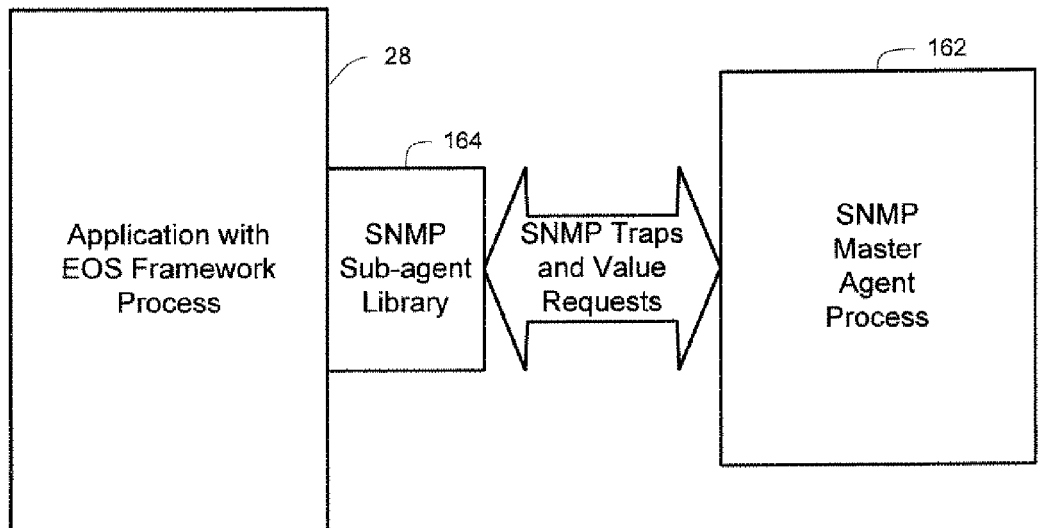
FIG. 11 is a block diagram illustrating the interaction between an application and a master agent in accordance with the principles of the present invention.

The SNMP system component 140 delivers alerts and performance statistics to the network management station via Simple Network Management Protocol (SNMP). In one embodiment, the SNMP system 140 has a master agent 162, a sub-agent 164, an alert agent 166, and a statistics agent 168. The master agent 162 includes a template for creating a SNMP sub-agent library, which is statically linked in with the application executable. The statistics agent 168 and the alert agent 166 are grouped together under the EOS Framework network management component 140 as a single library. The sub-agent 164 acts as an interface between the application 28 and the master agent 162, as shown in FIG. 11. The alert agent 166 monitors alert messages and dispatches SNMP alerts when the alerting conditions are met. The statistics agent 168 is responsible for reporting operational statistics via SNMP. The SNMP system interface 140 may provide the following methods: enable alerts, disable alerts, get tag read rate, and get input trigger rate.

The network management component 58 is not instantiated by the framework initialization code. EOS Framework 30 does not require this component to run; however; in order to include the SNMP system 58, the application 28 should instantiate this component separately.

Message Display

Figure 12:
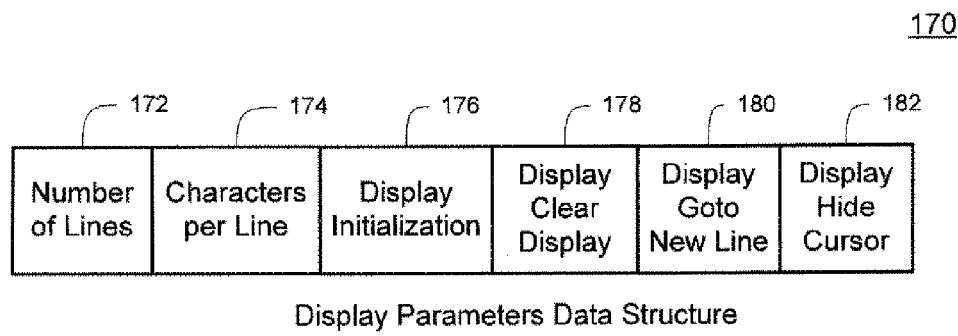
FIG. 12 is a diagram of a display parameters data structure constructed in accordance with the principles of the present invention.
Figure 13:
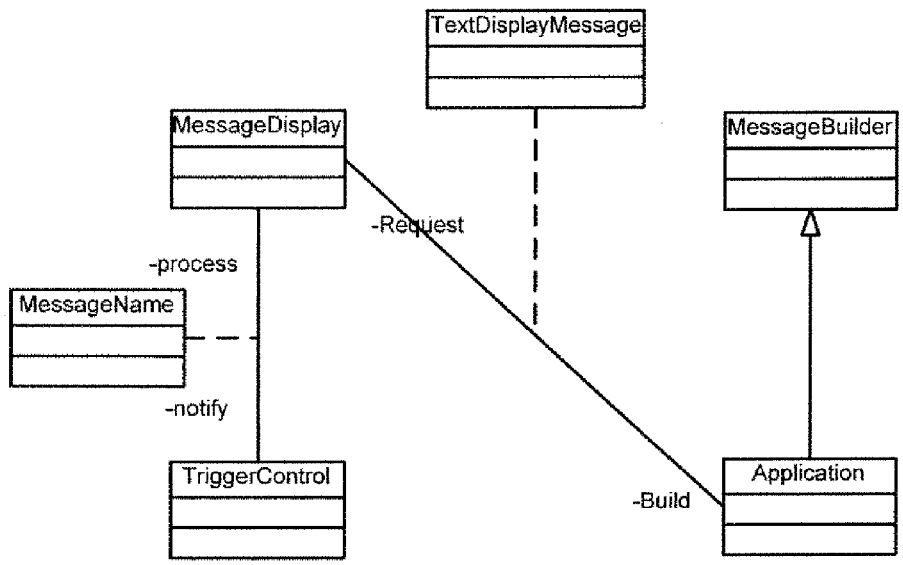
FIG. 13 is a block diagram illustrating the interaction between an application, a reader device, and various interfaces constructed in accordance with the principles of the present invention.
Figure 13:
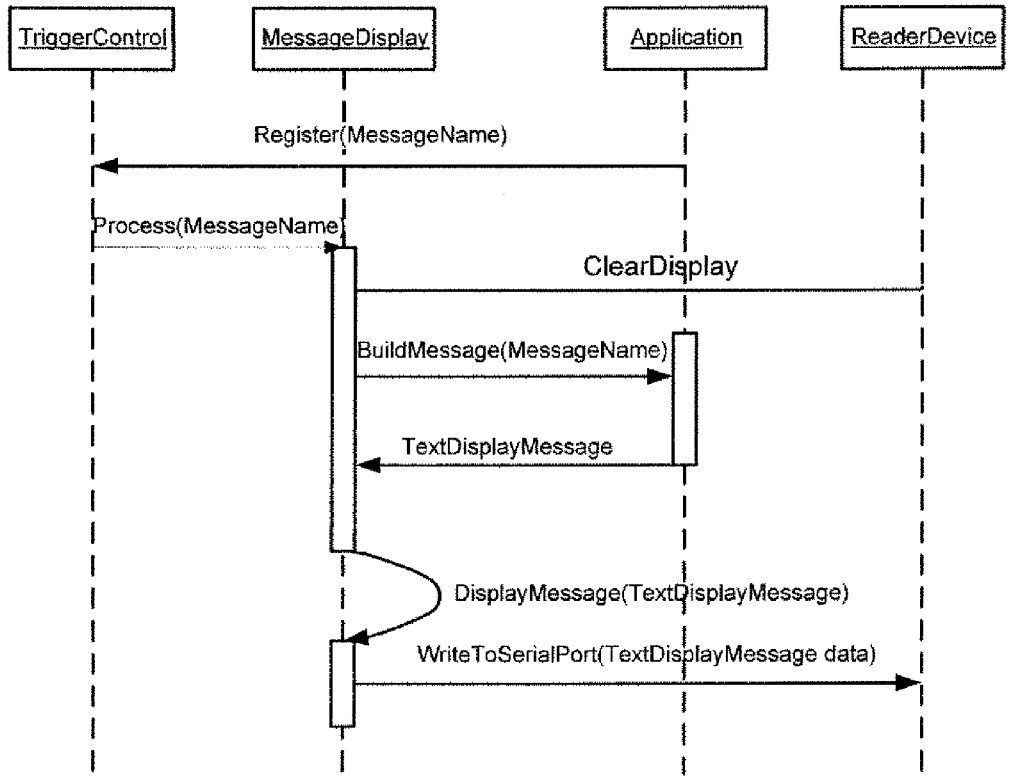

The message display component 60 is responsible for displaying application text messages on an LED/LCD display connected to the reader I/O interface 20. The message display component 60 is initialized with the display parameters data structure 170, as shown in FIG. 12. These parameters include, but are not limited to, the number of lines available on the display 172, characters per line 174, i.e., the number of characters that fit on a line, a display initialization 176 command string, a display clear display 178 command string, a display goto new line 180 command string, and a display hide cursor 182 command string. Because the displayed messages are dynamic and may be updated during run time, the application 28 registers as a message builder with the message display agent 60, as shown in FIG. 13. This drawing represents a sequence diagram depicting the steps involved for the application to register as a message builder with the Message Display Agent and display the message.

The message display interface 60, in an exemplary embodiment, provides the user with the following methods:

Register message builder with the Message Display component

Deregister message builder from the Message Display components

Display Message with message name as a parameter

Display Message with message structure as a parameter.

Figure 14:
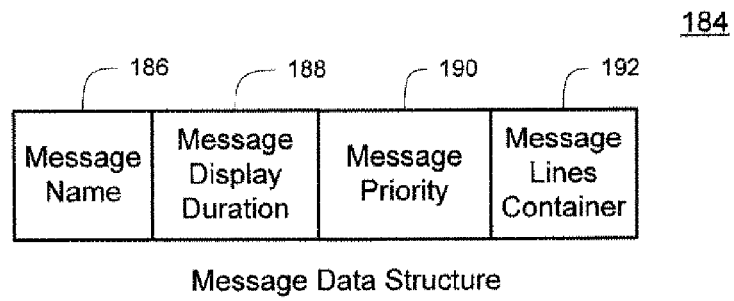
FIG. 14 is a diagram of a message data structure constructed in accordance with the principles of the present invention.
Figure 15:
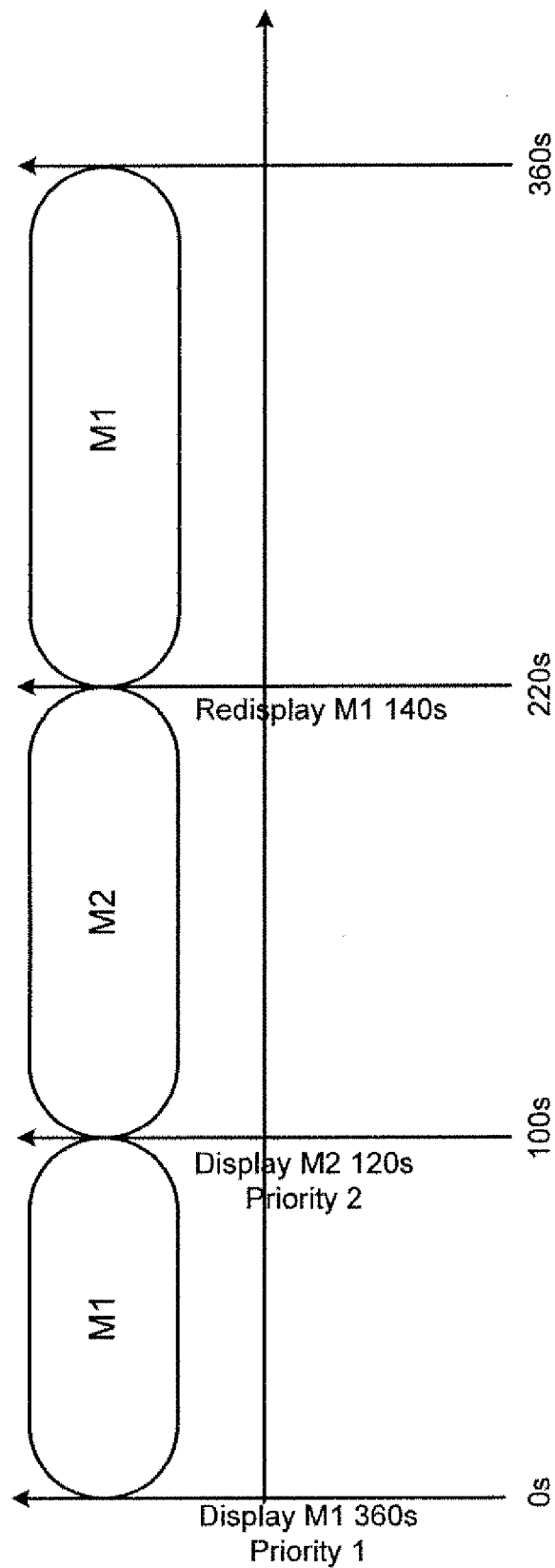
FIG. 15 is a timing diagram illustrating displaying two messages according to a priority schedule in accordance with the principles of the present invention.

The message data structure 184, as shown in FIG. 14, is passed as a parameter to the message display agent 60. The message data structure 184 may include, but is not limited to a message name 186, message display duration 188, message priority 190, and message lines container 192. Each message has a display priority 190 and display duration 188. Higher priority messages overwrite lower priority messages. In addition, an overwritten lower priority message may complete its remaining duration once the higher priority message has completed its display duration. For example, referring to FIG. 15, suppose there are two messages, M1 having a duration of 360 seconds and priority 1, and M2 having a duration of 60 seconds and priority 2. Message display agent 60 is requested to display M2 100 seconds after M1 has begun displaying. FIG. 15 shows an example of in what order and for how long the messages are displayed.

Application Utilities

Figure 16:
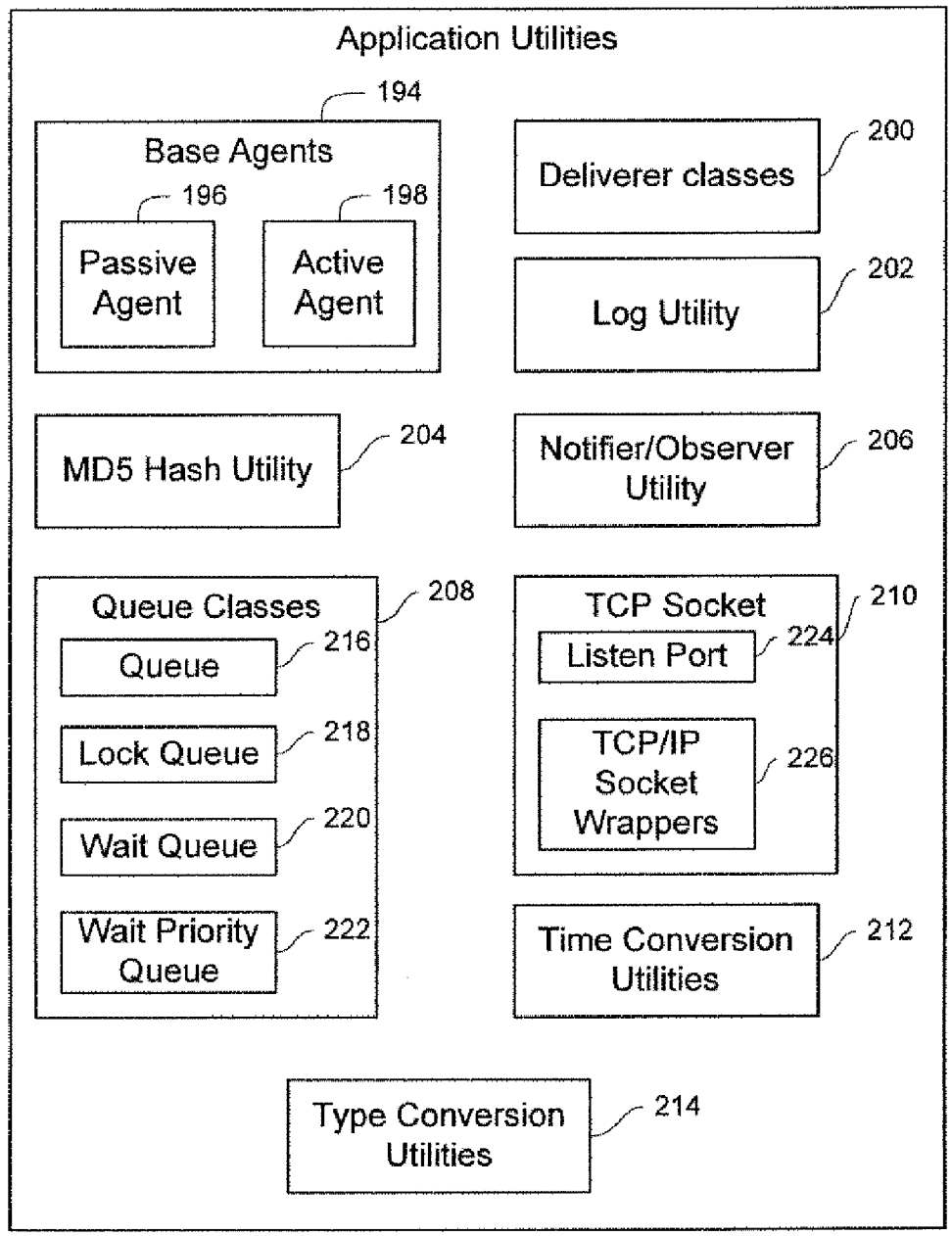
FIG. 16 is a block diagram of an application utilities component constructed in accordance with the principles of the present invention.

In order to facilitate faster feature and application development, the EOS Framework 30 provides a set of application utilities 62, as shown in FIG. 16. These utilities 62 are used by the framework components as well as framework applications 28. Application utilities 62 may include, but are not limited to, base agents 194 (including passive agents 196 and active agents 198), deliverer classes 200, a log utility 202, an MD5 hash utility 204, a notifier/observer utility 206, queue classes 208, TCP socket utilities 210, time conversion utilities 212, and type conversion utilities 214. Each utility is described in detail below.

In accordance with one embodiment of the present invention, the EOS Framework 30 provides two types of base agents 194, a passive agent 196 and an active agent 198. A passive agent 196 is an abstract class that implements the following features:

Class reference counting, which allows the user to control number of instances of the objects in a system as well as creation and destruction of these objects.

Timer facility, which allows the user to start and cancel timers. When the timers expire, a timer event record is placed in a queue for the passive agent 196. The user monitors the queue for its expired timer records. The content of the timer record may be defined by the user.

Logging facility, which allows the user to log error and debug information into the framework log files as well as a system log.

Initialization, starting and destruction methods are provided as pure virtual functions which the user may implement, thus making the system more dynamic and flexible.

An active agent 198 contains passive agent features, as well as a thread and a semaphore which are used to control execution of the agent 198. An active agent 198 runs in the context of its thread. Initialization parameters for the active agent 198 may include RunMode, thread priority, thread stack size, sleep duration and block timeout.

An active agent 198 may run in four different modes: run with sleep, run blocked, run blocked with timeout, and run once. In the run with sleep mode, Run( ) method is executed, followed by the thread sleeping for a specified duration. When the thread wakes up, it executes Run( ) again and goes back to sleep. This is done until a request to terminate is received by the agent 198. In the run blocked mode, the Run( ) method is executed and then the thread is blocked. The thread is manually restarted before it is able to run again. In the run blocked with timeout mode, the agent 198 operates in the same manner as the run blocked mode, however, the thread is resumed when the timeout expires. In the run once mode, the thread executes the Run( ) method once and exits. Note that unlike threads, there is no need to implement an infinite thread loop. Also, the thread-safe destruction of an agent is handled automatically for the user as long he/she follows the agent pattern.

The deliverer classes 200 deliver data to the target host. One example of a deliverer 200 that may be implemented by the EOS Framework 30 is a Socket Connection Manager ("SCM"). This class uses TCP/IP sockets to connect and send data to the host computer. This class may also provide a user with the ability to set up two target hosts, a primary and a secondary (fail-over). SCM attempts to send data to the primary host first, but if unsuccessful, then attempts to send to the secondary. If both fail, SCM continues to bounce back and forth between the primary and the secondary until it establishes a successful connection. A user may configure SCM to enable or disable a handshake between the reader and the target host. When processing XML messages, SCM provides a method to receive an entire XML document using a document end XML tag to determine the end. The notification channel component 50 uses SCM to deliver tag events to the host.

The log utility 202 allows the user to log events and traces into a log file for debugging purposes. Each component has its own log object where it logs its events and traces. One embodiment of the log utility 202 uses two files for logging information. Initially, a first log file is written to until it reaches its maximum size. A second log file is then written to until it is also full. When both log files have reached their maximum capacity, the content of the first log file is erased and is replaced with new log messages. The log files may be stored in the reader's RAM file system, thereby preventing these files from surviving a reader reboot. Thus, if a user needed to save these files, they should be transferred to a non-volatile memory storage system e.g., floppy disk, harddrive, EEPROM, compact disc, memory stick, etc., prior to reboot.

The log utility 202 allows the user to classify logs based on the several severity levels. In one embodiment, logs may be classified as critical, error, info, trace and debug. A critical log may contain information concerning some critical error which causes the system to stop performing some or all of its functions. An error log may contain information relating to a recoverable error. A info log may contain one or more informational messages. A trace log may include function trace messages which indicate the application has entered or exited a function. A debug log includes debug messages. Each message in the log file may be time stamped. Additionally, closing a log file then reopening it may erase its previous content.

Figure 17:
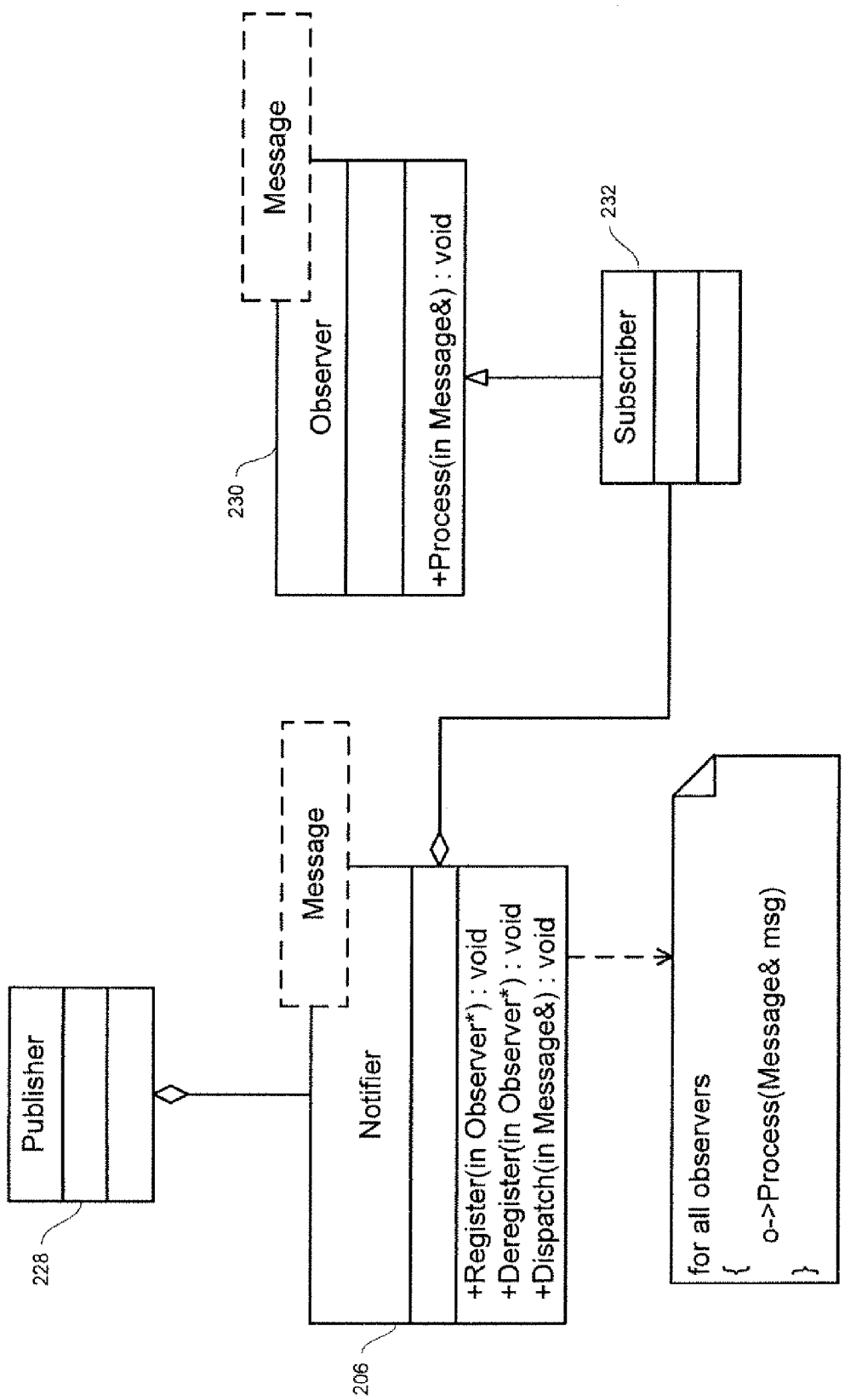
FIG. 17 is an exemplary design pattern constructed in accordance with the principles of the present invention.

The MD5 hash utility 204 allows a user to calculate the file's MD5 digest which is used to authenticate files when transferring them to the reader 10. A managing host, via command channel command, or an EOS Framework application 28 invoking a configuration manager 56 method, may retrieve the MD5 digest of a configuration file in order to ascertain the integrity of the file. In addition, the MD5 Hash interface 204 provides the ability to imbed the digest into the file itself, so that it may be transmitted with the file. The Notifier/Observer utility 206 is used to implement a Publisher—Subscriber design pattern. FIG. 17 shows how this design pattern is used in the framework. A Publisher class contains one or more Notifiers 206, each used for specific message. This pattern promotes low coupling between system components, thus reducing component dependencies and increasing flexibility. A publisher class 228 may contain one or more notifiers 206, each used for specific message. Components wishing to receive notifications subscribe by registering as Observers 230 with the sender of the message. The Notifier 206 broadcasts the notifications to all registered components. Subscribers 232 who inherit from the observer class 230 register themselves with the notifier 206. Subscribers 232 implement the process method, which is pure virtual in the Observer 230 class. When the publisher 228 dispatches a message to the subscribers 232, it calls a Notifier::Dispatch( ) method which, in turn, calls the subscribers process methods.

In one embodiment, the EOS Framework 30 also provides four types of queue classes 208 to the application developer. These are parameterized classes, and thus can be queues of any data type. The queue classes 208 may include Queue 216, LockQueue 218, WaitQueue 220, and WaitPriorityQueue 222. Queue 216 is a basic "first-in-first-out" ("FIFO") queue. It may be set to any size. In addition, to add and remove methods, Queue 216 also provides information about percentage of occupancy and availability. This queue is not strictly thread-safe, but may operate safely in a single producer/single consumer environment. Queue 216 is a non-blocking queue, i.e., the consumer thread will not be blocked if the queue is empty.

LockQueue 218 adds a lock to the queue, making it safe to use in multiple producer/multiple consumer environments. WaitQueue 220 supports all the features of the Queue class 216 in addition to blocking the consumer thread when the queue is empty. When an item is added to the queue, the consumer thread is unblocked. The WaitPriorityQueue 222 provides the user with the ability to add items and prioritize them inside the queue. WaitPriorityQueue 222 is also a blocking queue, i.e., the consumer is blocked when the queue is empty.

In order to improve EOS Framework 30 portability to other reader platforms as well as simplify communications over TCP/IP network, EOS Framework 30 implements TCP socket utilities 210 for Linux Socket interface. These wrappers include listen port 224 and TCP/IP socket wrappers 226. Listen port 224 allows the user to listen on a specific TCP/IP port for commands and incoming messages. TCP/IP socket wrappers 226 allow the user to poll, send and receive data. The TCP socket utilities 210 are used by the command handler component 54.

It is contemplated that at least some of the components in the EOS Framework 30 and applications 28 may need to manipulate time objects. To simplify these tasks, a set of time conversion utilities 212 are provided by the framework 30. For example, "Generate Time Stamp" generates a time stamp from an input time value in the form YYYY-MM-DDTHH:MM:SS. The input time value includes number of seconds and microseconds from beginning of UNIX EPOCH (00:00:00 UTC Jan. 1, 1970). "Generate Current Time Stamp" generates a time stamp given current system time. "TimeDiff", "TimeAdd" and "TimeClear" are wrappers for standard Linux struct timeval handling macros. "IsTimeInBetween", "IsGreaterThanOrEqual" and "IsLessThanOrEqual" are struct timeval comparison functions. Additional time conversion functions 212 convert milliseconds to struct timeval and convert struct timeval to milliseconds since beginning of UNIX Epoch and struct timeval. "Convert String To Time" includes a time stamp to struct timeval. "Get Current Time" gets current system time and "Get Uptime" gets the reader uptime since the last reboot.

The EOS Framework 30 also provides conversion utilities 214. These include, for example, convert string to unsigned integer, convert string to signed integer, convert string to Boolean, convert Boolean to string, convert hex string to array of bytes, and convert an unsigned integer to string. These utilities 214 simplify type conversions.

The component interfaces of the present invention define a set of interaction points between the interface and the external world. The interface specifies the services (messages, operations, and variables) a component provides, defines the computational commitments that a component may make and places constraints on its usage. Additionally, design patterns, as shown in FIG. 17, or templates may be utilized to ensure optimized solutions to recurring design problems. A façade pattern, for example, may be used in all component interface objects, to provide a consistent layer between the developer and the core and auxiliary components.

Additional design patterns incorporated into the framework may include Strategy, Singleton, and Factory. The Strategy Design Pattern basically consists of decoupling an algorithm from its host, and encapsulating the algorithm into a separate class. More simply put, an object and its behavior are separated and put into two different classes. This allows the application designer to switch the algorithm that he/she is using at any time. The Singleton Design Pattern ensures that a class has only one instance and provides a global point of access to that instance. The Factory Design Pattern specifies various ways to separate the construction of a complex object from its representation, letting the application designer use the same construction process to create different representations. The framework 30 may be available as a set of libraries in the form of library archives (".a" files). The libraries are accompanied by a set of header files which provide external interfaces to the framework's functionality. In addition, a version of the framework 30 may be available to run on a Linux personal computer ("PC") or other development platform, as well as a set of "device simulation" libraries, which allows a developer to write and test the application code on the PC prior to embedding in the reader 10.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A radio frequency identification ("RFID") reader comprising:
   a hardware platform, the hardware platform including:
      a transceiver, the transceiver arranged to receive communication signals from at least one RFID tag;
      an input/output interface;
      a controller communicatively coupled to the transceiver and the input/output interface, the controller controlling operation of the RFID reader; and
      a memory communicatively coupled to the controller, the memory containing:
         a software development framework for developing a software application that is executable on the hardware platform, the framework including a plurality of predefined encapsulated functional components that interact with at least one of the transceiver and the input/output interface to allow the software application to operate in a manner that is independent of a specific embodiment of the RFID reader hardware platform, the functional components including a set of core components, the set of core components enabling the software application to operate; wherein the set of core components includes:
            a reader interface, the reader interface operating and managing the RFID reader;
            a tag state handler, the tag state handler filtering responses received from RFID tags according to a current state;

a version manager, the version manager maintaining and supporting RFID reader software version information;

a license support manager, the license support manager issuing and monitoring a license for the software development framework; and a set of operating system wrappers, the operating system wrappers implementing a consistent usage policy for operating system functions.

2. The RFID reader of claim 1, wherein the functional components further include at least one auxiliary component.

3. The RFID reader of claim 2, wherein the at least one auxiliary component is at least one of an RF control component, a trigger control component, a notification channels manager, a general purpose output controller, a command handler, a configuration manager, a network management component, a message display component, and an application utility.

4. The RFID reader of claim 3, wherein the at least one auxiliary component is an application utility, the application utility including at least one of a base agent, a deliverer class, a log utility, an MD5 hash utility, a notifier utility, a queue class, a TCP socket utility, a time conversion utility, and a type conversion utility.

5. The RFID reader of claim 2, wherein the at least one auxiliary component is an RF control component, the RF control component processing RF schedules, RF searches and schedules tag searches.

6. The RFID reader of claim 2, wherein the at least one auxiliary component is a trigger control component, the trigger control component processing triggers, each trigger including an input trigger and a set of actions to perform.

7. The RFID reader of claim 2, wherein the at least one auxiliary component is a notification channels manager, the notification channels manager managing notification channels to deliver tag event data to host computers.

8. The RFID reader of claim 7, wherein the tag event data contains at least one of an event type, a tag state, a tag source name, a tag identifier, an air protocol, a trigger, and a tag detection time.

9. The RFID reader of claim 2, wherein the hardware platform further includes an input/output port controlled by the input/output interface, wherein the at least one auxiliary component is a general purpose output controller, the general purpose output controller controlling a state of the input/output port.

10. The RFID reader of claim 2, wherein the at least one auxiliary component is a command handler, the command handler processing commands from a host computer.

11. The RFID reader of claim 2, wherein the at least one auxiliary component is a configuration manager, the configuration manager extracting component configuration parameters from configuration files of the software development framework.

12. The RFID reader of claim 2, wherein the at least one auxiliary component is a network management component, the network management component reporting outage events and delivering alerts and performance statistics.

13. The RFID reader of claim 2, wherein the at least one auxiliary component is a message display component, the message display component outputting application messages for presentation.

14. A method for developing software applications residing on a radio frequency identification ("RFID") reader, the RFID reader including a memory, the method comprising:

storing a software development framework in the memory of the RFID reader, the software development framework including a plurality of predefined functional components that interact with the RFID reader in a manner that is independent of RFID reader hardware, the functional components include a set of core components, the set of core components enabling the software application to operate, wherein the set of core components includes:

a reader interface, the reader interface operating and managing the RFID reader;

a tag state handler, the tag state handler filtering responses received from RFID tags according to a current state;

a version manager, the version manager maintaining and supporting RFID reader software version information;

a license support manager, the license support manager issuing and monitoring a license for the software development framework; and a set of operating system wrappers, the operating system wrappers implementing a consistent usage policy for operating system functions.

15. The method of claim 14, wherein the functional components further include at least one auxiliary component.

16. A system for developing radio frequency identification ("RFID") reader-resident applications, the system comprising:

an RFID reader, the RFID reader having a hardware platform including a memory for storing at least one software application; and a host computer communicatively coupled to the RFID reader, the host computer including:

a software development framework for developing the at least one software application, the framework including predefined encapsulated functional components that interact with the RFID reader hardware platform to allow the at least one software application to operate in a manner that is independent of a specific embodiment of the RFID reader hardware platform, the functional components including a set of core components, the set of core components enabling the software application to operate, wherein the set of core components includes:

a reader interface, the reader interface operating and managing the RFID reader;

a tag state handler, the tag state handler filtering responses received from RFID tags according to a current state;

a version manager, the version manager maintaining and supporting RFID reader software version information;

a license support manager, the license support manager issuing and monitoring a license for the software development framework; and a set of operating system wrappers, the operating system wrappers implementing a consistent usage policy for operating system functions.

* * * * *